(12) United States Patent
Viswanath et al.

(10) Patent No.: US 9,747,507 B2
(45) Date of Patent: Aug. 29, 2017

(54) GROUND PLANE DETECTION

(71) Applicant: Texas Instruments Incorporated, Dallas, TX (US)

(72) Inventors: Prashanth R. Viswanath, Bangalore (IN); Suriya Narayanan L, Tirupur (IN)

(73) Assignee: Texas Instruments Incorporated, Dallas, TX (US)

( * ) Notice: Subject to any disclaimer, the term of this patent is extended or adjusted under 35 U.S.C. 154(b) by 265 days.

(21) Appl. No.: 14/567,481

(22) Filed: Dec. 11, 2014

(65) Prior Publication Data
US 2015/0178573 A1 Jun. 25, 2015

(30) Foreign Application Priority Data

Dec. 19, 2013 (IN) .......................... 5955/CHE/2013

(51) Int. Cl.
| | | |
|---|---|---|
| G06K 9/00 | (2006.01) | |
| G06K 9/46 | (2006.01) | |
| G06K 9/66 | (2006.01) | |
| G06K 9/32 | (2006.01) | |
| G06K 9/36 | (2006.01) | |
| G06T 7/536 | (2017.01) | |
| G06T 7/579 | (2017.01) | |

(52) U.S. Cl.
CPC ..... G06K 9/00798 (2013.01); G06K 9/00791 (2013.01); G06T 7/536 (2017.01); G06T 7/579 (2017.01); G06T 2207/30256 (2013.01)

(58) Field of Classification Search
None
See application file for complete search history.

(56) References Cited

U.S. PATENT DOCUMENTS

| | | | | |
|---|---|---|---|---|
| 2002/0159616 A1* | 10/2002 | Ohta | ................. | G06K 9/00798 382/104 |
| 2003/0040864 A1* | 2/2003 | Stein | ................... | G05D 1/0246 701/400 |
| 2003/0103650 A1* | 6/2003 | Otsuka | .............. | G06K 9/00798 382/104 |
| 2006/0227041 A1* | 10/2006 | Okamoto | ............... | G06T 7/002 342/174 |

(Continued)

FOREIGN PATENT DOCUMENTS

| | | | | |
|---|---|---|---|---|
| JP | EP 2098992 A1 * | 9/2009 | ......... | G06K 9/00798 |
| JP | EP 2674893 A2 * | 12/2013 | ......... | G06K 9/00798 |

OTHER PUBLICATIONS

Lourakis et al., "Chaining Planar Homographies for Fast and Reliable 3D Plane Tracking", Proceedings of the 18th International Conference on Pattern Recognition, 2006, pp. 1-5.*

(Continued)

*Primary Examiner* — Matthew Bella
*Assistant Examiner* — Jose M Torres
(74) *Attorney, Agent, or Firm* — Lawrence J. Bassuk; Charles A. Brill; Frank D. Cimino

(57) ABSTRACT

A ground plane detection system including an imaging device operable to generate at least two images of a scene and an image processing assembly operable to receive the at least two images of the scene and to generate a model of each image and to perform homography computations through use of corresponding features in the models of each image.

11 Claims, 5 Drawing Sheets

(56) References Cited

U.S. PATENT DOCUMENTS

| | | | | |
|---|---|---|---|---|
| 2009/0295917 A1* | 12/2009 | Zhang | ................ | G06K 9/00798 348/119 |
| 2010/0309674 A1* | 12/2010 | Su | .................... | B60G 17/01908 362/466 |
| 2013/0002871 A1* | 1/2013 | Natroshvili | ........... | G06T 7/0018 348/148 |
| 2013/0120125 A1* | 5/2013 | Wu | .................... | G06K 9/00798 340/439 |
| 2013/0141580 A1* | 6/2013 | Stein | ........................ | H04N 7/18 348/148 |

OTHER PUBLICATIONS

Arrospide et al. "Homography-based ground plane detection using single on-board camera", IET Intelligent Transport Systems, vol. 4 Issue 2, Jun. 2010, pp. 149-160.*

* cited by examiner

GROUND PLANE DETECTION

This application claims priority of Indian Provisional Application No. 5955/CHE/2013, filed Dec. 19, 2013, which is hereby incorporated by reference for all that it discloses.

BACKGROUND

Ground plane detection is an important pre-processing step in the field of embedded vision. In advanced driver assistance systems (ADAS), ground plane detection operations provide information for location of a road plane in an image. This information may be used in various ADAS applications such as obstacle and vehicle detection.

Various approaches exist for ground plane detection including use of stereo images, use of homography and texture-based segmentation. However, each of these approaches has drawbacks. There is a need for an improved method for ground plane detection, particularly one that could be used in ADAS.

DETAILED DESCRIPTION

This disclosure, in general describes a method of ground plane detection that involves initially selecting two images from a series of images of a road scene. In one example embodiment these images are produced by an automobile imaging device, such as a video camera mounted on the automobile. Images, which may be, for example, separate still images or frames of a video clip, are transmitted from the imaging device to an image processing assembly. The imaging processing assembly may be implemented in hardware, software or firmware, or some combination thereof. It may be provided within a single housing or region or may be spread among a number of separate interconnected devices. The imaging assembly performs processing steps on at least two images received from the imaging device that results in data representative of a ground plane of the road image. The processing steps include creating a road model of each image of the scene and performing homography computations using corresponding features of these road models.

Various embodiments of the methods and apparatus described herein may provide some or all of the below described advantages. In some embodiments, a "road model" is created, which is used to determine a "region of interest" (ROI) in analyzed images. The region of interest, thus determined, is used for obtaining a homography matrix, which, in turn, is employed for ground plane detection. This manner of ground plane detection is generally more reliable and more efficient than that of the prior art. The use of a road model to determine the ROI can result in a significant reduction in the data that needs to be processed, saving memory, bandwidth and compute cycles. Also, system accuracy may be improved. The described embodiments may be advantageously implemented in real-time systems, such as ADAS, because of the reduction in processing time and increased accuracy. Also, in some embodiments, a lane masking algorithm is used that prevents road lane lines from being detected as false obstacles. The detection of road lane lines as false obstacles has heretofore been a drawback of homography based ground plane detection.

Figure 1:
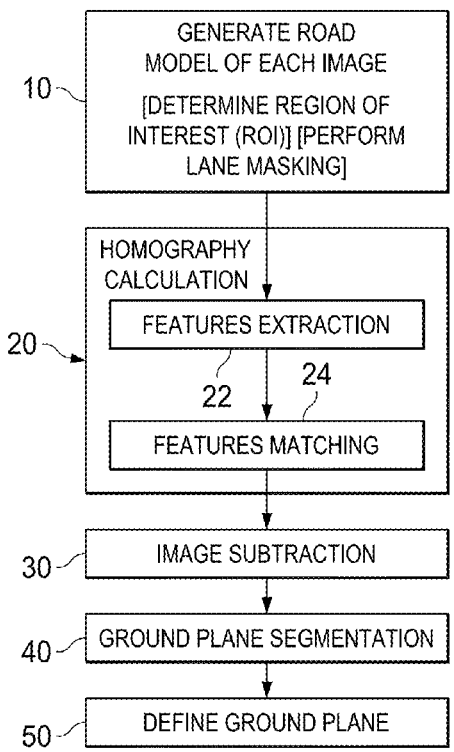
FIG. 1 is a flow chart of an example embodiment of a method of detecting a ground plane from images in adjacent frames.

FIG. 1 illustrates a method to detect the ground plane of a road scene from two images of the scene. The method will be described briefly immediately below with reference to FIG. 1. Each block of the method shown in FIG. 1 will then be further described with reference to other drawing Fig.s. As shown at block 10, the method includes generating a road model of each image. Generating a road model may include determining a region of interest in each image and may also include performing lane masking in each image. As shown at block 20, next, a homography calculation is performed. This homography calculation includes, as shown at 22, extraction of features from each of the two images and, as shown at 24, matching of the extracted features. The extracted features are used to create homography matrices, which are used to warp one of the images. As shown at 30 the warped image is subtracted from one of the original images to segment the ground plane as shown at 40. Information from the segmented ground plane is used, as shown at 50, to define a detected ground plane.

Figure 2:
FIG. 2 is an initial image (current frame) of a road scene.
Figure 3:
FIG. 3 is an illustration of the image of FIG. 2 after region of interest ROI) extraction.

As indicated in FIG. 1, block 10, initially a road model of each image is generated. Generating this road model may include determining a region of interest for further processing and may also include performing lane masking. FIG. 2 illustrates one of the two images for which a region of interest (ROI) is to be determined. It may be seen from viewing the image that it contains a number of straight lines formed by various features of the image such as lane markings, a road edge line, a guard rail, etc. The lines in an image may be detected through the use of various transformation algorithms. In this embodiment, the lines of the image are detected by using a Hough transform for lines. The lines that are detected may be selected from a predetermined range of inclinations with respect to the horizontal axis (x-axis) of the image. For example, in one embodiment the range of inclinations is 25° to 155°. A vanishing point in the image is found by selecting the lines with the minimum angle of inclination and the maximum angle of inclination 110, 112 with respect to the x-axis. The point of intersection 114 of these lines 110, 112 is the vanishing point. The "Horizon" in the image of FIG. 3 is defined as a line 116 that passes through this vanishing point. In this embodiment the "Horizon" is horizontal as defined by the X,Y axis, i.e., y is constant in the equation for this line. The area below the Horizon is the region of interest (ROI).

There are several advantages of determining an ROI, which is used for further processing. These advantages include reduced processing and memory bandwidth, since only a part of the image, not the entire image is further processed. Another advantage is that when determining the feature points for homography computation, described below, selecting a ROI in this manner ensures that a majority of the feature points that will be obtained for this calculation belong to the ground plane, since a large percentage of the ROI, selected in the described manner, is covered by the road, as can be seen in FIG. 3.

As shown at block 10 in FIG. 1 generating a road model of each image may also include a lane masking. To perform lane masking in one example embodiment, a lane masking algorithm is applied to the extracted ROI of FIG. 3. Each pixel in the ROI is compared with its forward and backward neighbor (a gives the search range of the neighbor) and checked to determine if it is greater than a predetermined threshold. Since lanes are generally white, the threshold will generally be set rather high, but the threshold may be adjusted to take into account the actual conditions in the region of interest. If the pixel is not greater than the threshold, then the pixel value is maintained as it is. If the pixel value is greater than the threshold, then this pixel value is replaced by an average value around the pixels neighborhood. While checking the pixel with its forward and rear neighbor, a check is also performed for gradient change. The reason for this is that if there is a gradient change, then the neighbor pixel would probably not belong to the lane line and would likely belong to the road. Hence, the average pixel of the neighbors that would be used to replace the pixel value of the lane line would be more accurate.

As will be obvious to those skilled in the art, each image, including the image in FIG. 3, is formed from pixels arranged in rows and columns. The specific steps to be performed for lane line masking may be as follows:
1. Query each pixel starting from the left with an offset, a for every row under the horizon. Subtract twice the pixel value from the values of pixels which are situated at i-α and i+α distances.
2. Check to determine if the result is above a predetermined threshold.
3. If YES, check if there is high gradient while moving from a few pixels to the left of this pixel rightwards.
4. If YES, obtain the average of pixel values from i-β to i-μ and set this value for the pixel.
5. If No to (3.), leave the pixel as it is.
6. If No to (4.), set the pixel value to the last updated i-β to i-μ pixel range average value.
7. A similar procedure is followed for the right edge of the lane marking.

In the above example the setting are as follows: α=18, β=4 and μ=10. The values of α, β and μ depend upon parameters of the camera that is used—mainly the image resolution and the camera zoom. The image set used in the illustrated embodiment had a resolution of 320×240 without a fixed level of focus. For a zoomed image of the same resolution, the parameter values will increase. The parameter values will also increase in the case of a higher resolution image using the same zoom. The values of α, β and μ may be empirically determined for any camera by experimenting with images of different zoom and different resolution.

Figure 5:
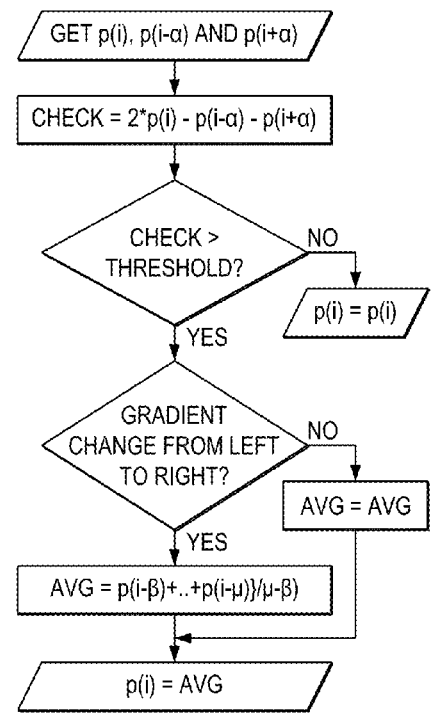
FIG. 5 is a flowchart illustrating an example embodiment of a lane masking process.
Figure 4:
FIG. 4 is an illustration of the image of FIG. 3 after lane masking.

An example of an output image after performing lane masking is illustrated in FIG. 4. An example of a lane masking algorithm is illustrated in the flow chart of FIG. 5. The above described ROI determination and the lane masking operation are performed on each of the two images of the road scene that are used in this process. In one embodiment the two images are adjacent frames in a video clip.

Next features extraction is performed on each of the two selected images and these extracted features of the different images are matched as shown at 24. Next the matching features of the two images are subtracted to provide a segmented ground plane as shown at 100.

Although simple image subtraction between the two sequential images of the road scene can be performed, the accuracy of the subtracted image will generally be poor. In the illustrated embodiment a homography matrix is computed and used is to warp the previous image as indicated in FIG. 1 by box 20 that encompasses the features extraction and features matching boxes 22, 24. The use of homography to warp the previous image before feature extraction and feature matching, as shown at 20, generally provides a better segmented image and will now be described.

Nomography is a property by which the coplanar points in one image are mapped to corresponding points on the other image. Nomography has 8 degrees of freedom. Hence, if correspondence for 4 points between 2 images is known, then the homography matrix can be computed.

Figure 6:
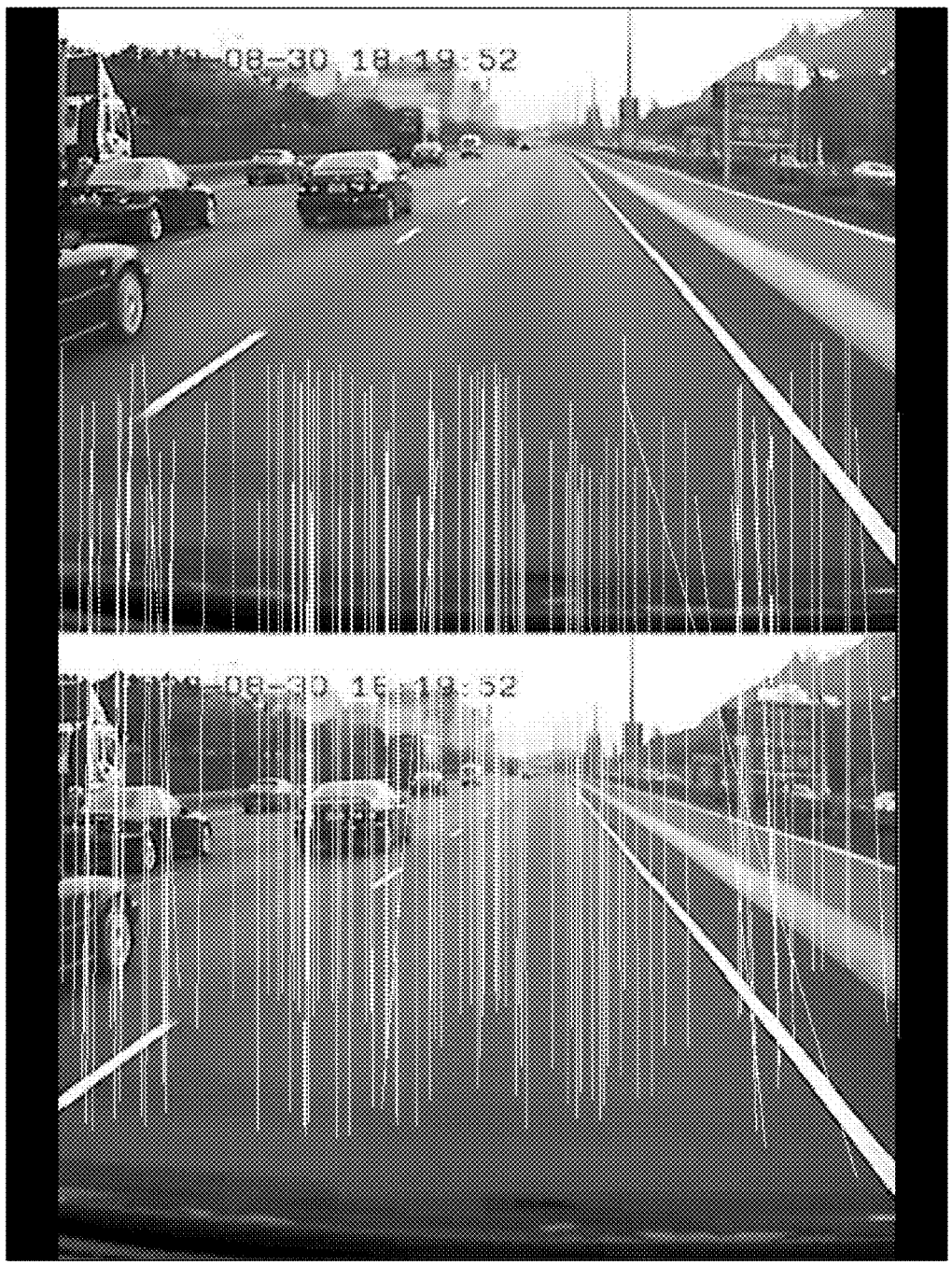
FIG. 6 is an illustration of an example embodiment of a feature correspondence process performed on the image of FIG. 4.

In order to compute the homography matrix, the first procedure it to extract features on the current image and the previous image, as shown at 22 in FIG. 1. There are various methods that may be used to extract features. In one method embodiment the Oriented Fast and rotated Brief (ORB) algorithm is used to extract features and their corresponding descriptors. These descriptors are then used to perform a correspondence matching, which indicates the correspondence of feature points between the current and the previous images. FIG. 6 shows an example of results of this feature correspondence operation with vertical lines extending between correspondence points in the two images.

Using these obtained corresponding features, 4 points are randomly selected and the associated homography matrix is determined. This procedure is repeated multiple times for different set of 4 points and homography matrices are obtained for all of these sets of points. Out of all these homography matrices, the most dominant homography matrix is selected through use of the RANSAC algorithm.

Since only ROI (below the horizon) information is used, most of the feature points obtained are on the ground plane. Hence, the homography matrix obtained is for the ground plane.

Figure 7:
FIG. 7 is an illustration of the image of FIG. 6 after performance of an example warping process.

The dominant homography matrix thus computed is used to warp the previous image. By warping the previous image, all the points along the ground plane are warped correctly, since it satisfies the homography matrix. The points that are not on the ground plane are not mapped correctly. The warped image is as shown in FIG. 7.

Next the warped previous image is subtracted from the current image. The subtracted image is as shown in FIG. 8.

Figure 8:
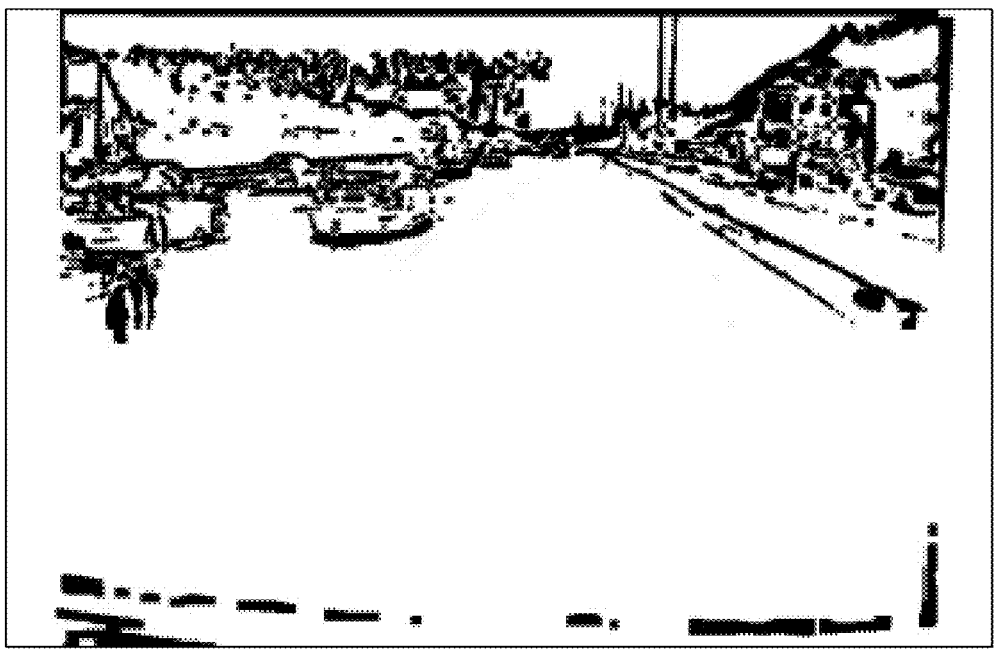
FIG. 8 is an illustration of the image of FIG. 7 after image subtraction.
Figure 9:
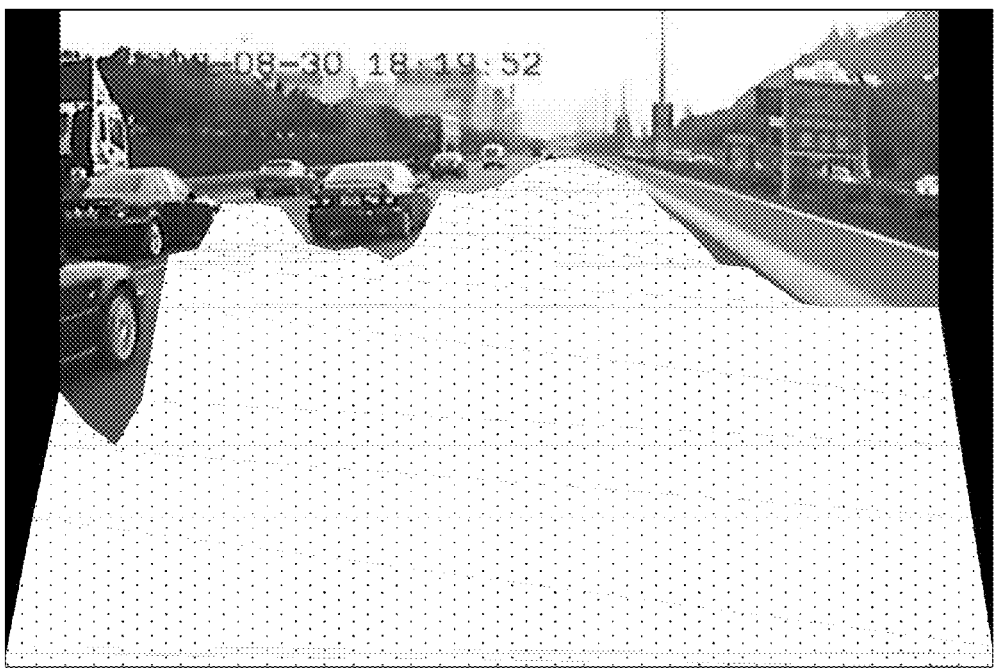
FIG. 9 is an illustration of the image FIG. 8, after ground plane segmentation, showing the detected ground plane.

The subtracted image shown in FIG. 8 is used to segment the ground plane. Every pixel column in the subtracted image is scanned from the bottom of the image and the first encountered non-zero pixel point is stored. These stored points define the boundary of the ground plane. The resulting detected ground plane is shown in FIG. 9.

Figure 10:
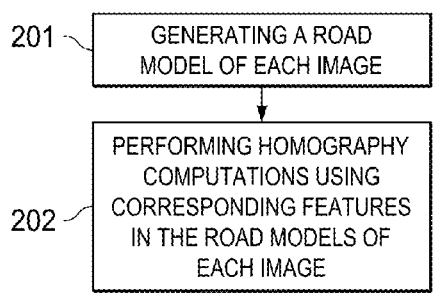
FIG. 10 is a block diagram of an example embodiment of a ground plane detection system.

As shown by FIG. 10, one embodiment of a method to detect the ground plane of a road scene from two images of the scene comprises, as shown at block 201, generating a road model of each image. The method also includes, as shown at 202, performing homography computations using corresponding features in the road models of each image.

Figure 11:
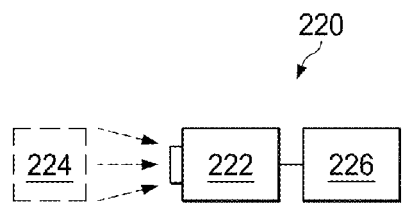
FIG. 11 is a flow chart of an example embodiment of a method of detecting the ground plane of a road scene.

FIG. 11 is a schematic representation of a ground plane detection system 220. The system 220 includes an imaging device 222, such as a digital video camera, operable to generate at least two images of a scene 224. The system 220 includes an image processing assembly 226, such as a microprocessor with appropriate software or firmware or hardware, that is operable to receive the two images of the scene 224 from the imaging device 222 and to generate a model of each of the images and that is also operable to perform homography computations through the use of the corresponding feature in the models of each image.

Although certain embodiments of a ground plane detection system and methods of operation thereof have been expressly described herein, alternative embodiment of a ground plane detection system and methods of detecting a ground plane will occur to those skilled in the art, after reading this disclosure. It is intended that the appended claims be broadly construed to cover such alternative embodiments, except to the extent limited by the prior art.

What is claimed is:

1. A method to detect the ground plane of a road scene from two images of the scene comprising:
    generating a road model of each image;
    determining a vanishing point in each image;
    determining a region of interest in each image by selecting a region of the image positioned below a horizon line extending through the determined vanishing point in each image;
    masking lane markings in each image:
    determining corresponding feature points in the road models of each image by extracting features and their corresponding descriptors from each image and comparing the descriptors from one image to that of the other image;
    performing homography computations using corresponding features in the road models of each image;
    using a plurality of the corresponding features to select sets of homography points and computing a plurality of homography matrices from the sets of homography points; and
    selecting the most dominant homography matrix and using it to warp one of the images.

2. The method of claim 1 in which the determining a vanishing point includes using Hough Lines to find lines in the image.

3. The method of claim 2 in which the using Hough Lines to find lines in the image includes finding lines inclined within a predetermine range with a horizontal axis of the image.

4. The method of claim 3 in which the finding lines inclined within a predetermine range with a horizontal axis of the image, includes finding lines within a range of about 25° to 155°.

5. The method of claim 1 in which the generating a road model includes masking lane markings in each image.

6. The method of claim 5 in which the masking lane markings in each image includes comparing the value of each pixel in at least a portion of the road model to a value associated with certain neighbor pixels and, based upon the comparison maintaining the value of the pixel or changing the value of the pixel.

7. The method of claim 5 in which the masking lane marking includes applying a lane masking algorithm.

8. The method of claim 1 including performing a subtraction operation on the warped image and the other image to obtain a subtracted image.

9. The method of claim 8 including using the subtracted image to segment the ground plane of the image.

10. The method of claim 9 in which using the subtracted image to segment the ground plane includes scanning the pixel columns in the subtracted image from the bottom of the image and storing the first encountered non-zero pixel point in each column.

11. The method of claim 10 including using the stored non-zero pixel points to define a detected ground plane.

* * * * *